(No Model.)
G. J. HANNI.
RIDING HARROW.
No. 269,051. Patented Dec. 12, 1882.
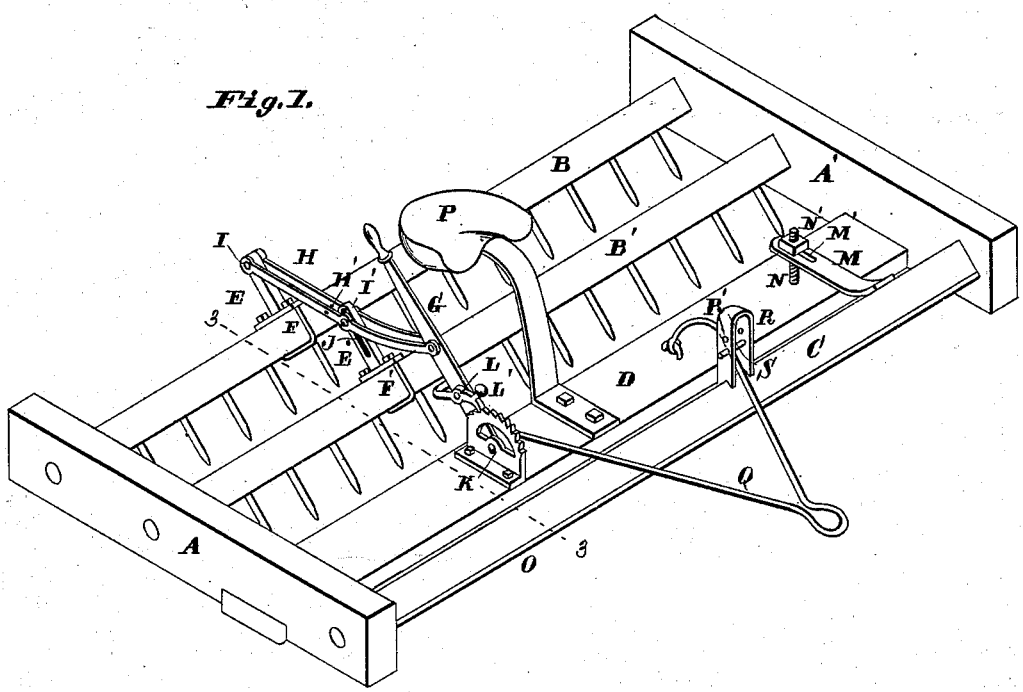
Attest:
Charles Pickles
Wm. G. Sayers
Inventor:
Godfrey J. Hanni
By Knight Bros
attys

UNITED STATES PATENT OFFICE.

GODFREY J. HANNI, OF ST. JACOB'S, ILLINOIS.

RIDING-HARROW.

SPECIFICATION forming part of Letters Patent No. 269,051, dated December 12, 1882.

Application filed August 29, 1882. (No model.)

*To all whom it may concern:*

Be it known that I, GODFREY J. HANNI, of St. Jacob's, in the county of Madison and State of Illinois, have invented a certain new and useful Improvement in Riding Harrows, of which the following is a full, clear, and exact description, reference being had to the accompanying drawings, forming part of this specification, in which—

Figure 1 is a perspective view; and Figs. 2 and 3, transverse sections taken on line 3 3, Fig. 1, Fig. 2 showing the harrow set with the teeth pointing forward, and Fig. 3 showing it set with the teeth inclined backward.

My invention relates to a riding-harrow, and one in which the teeth may be made to point forward for loosening the ground when it is hard and packed, or assume a vertical position, or be made to incline backward for light harrowing. There are also scrapers combined in the harrow, which act to crush clods and level the ground.

My invention consists in various novel features, hereinafter fully described and claimed.

A A' represent the side strips or pieces of the harrow, connected at the rear by tooth-bars B B', and at the front by a tooth-bar, C, and a scraper-bar, D. The tooth-bars are all secured to the side pieces in such a manner that they will rock freely in their bearings. The two rear tooth-bars have upward-projecting arms E E', respectively secured to them by clips F F' or by other suitable means. The upper ends of these arms are connected together and to a lever, G, by means of a bar or bars, H, preferably two, as shown in Fig. 1. The arms connect with the bars by means of pivot-pins I and I', the latter, I', working in a slot, J, in the arm E', so that the parts can operate. The lower end of the lever G is pivoted to the scraper-bar D, or to a ratchet-plate, K, secured to the bar, preferably to the latter, as shown.

Upon the lever, just above the ratchet-plate, so as to engage the teeth thereof, is pivoted a pawl, L, with its rear end turned so that it can be operated by the foot of the driver and its forward end having a weight, L', which keeps it in contact with the teeth of the ratchet-plate except when raised by the foot. Thus it will be seen that by operating the lever either of the described positions can be given to the teeth of the bars B B', and the inclination of the teeth of the bar B' relative to those of the bar B can be changed by putting the pivot-pin I' through holes H' in the connecting-bars H.

The teeth of the front bar, C, always incline backward; but their inclination may be changed by means of an arm, M, secured to the bar and extending back over the scraper-bar D, a slot, M', in its end receiving a bolt, N, extending up from the scraper-bar, with a nut, N', for regulating the position of the arm, and consequently the position of the bar C.

Secured to the bar C is a strip, O, projecting beneath the bar, for the purpose of breaking clods and leveling the ground, and the scraper-bar D is for the same purpose, the lower front corner preferably being rounded, as shown.

P represents the driver's seat, secured to the scraper-bar D, and Q the draft-bail, which is also secured to the scraper-bar.

To prevent the forward end of the harrow descending too far into cavities in the ground—such as dead-furrows, &c.—and the consequent tilting up of the rear end, I secure a yoke, R, to the strip or bar C, which straddles the bail, as shown, and which has a pin, S, above the bail, the pin being adjustable by means of holes R' in the yoke. Thus the draft-bail will support the forward end of the harrow at such times.

I do not claim broadly rocking teeth and scraper-bars with means for changing their inclination; but

I claim as my invention—

1. In a harrow, the combination of side pieces, A A', rocking tooth-bars B B', and scraper-bar D, the tooth-bars being connected to the scraper-bar by means of arms E E', connecting bar or bars H, lever G, with weighted pawl L, and ratchet-plate K, all substantially as shown and described, and operating as set forth.

2. In a harrow, the combination of side strips, A A', scraper-bar D, and rocking tooth-bar C, the bars D and C being connected by an arm, M, bolt N, and nut N', substantially as shown and described, for the purpose set forth.

GODFREY J. HANNI.

Witnesses:
SAML. KNIGHT,
GEO. H. KNIGHT.